United States Patent [19]

Hall et al.

[11] Patent Number: 5,400,671
[45] Date of Patent: Mar. 28, 1995

[54] SIDE SHIFTING MECHANISM FOR TRANSAXLE

[75] Inventors: James E. Hall, Mt. Vernon; James H. Bostic, Bellville; Timothy L. Teeter, Richland; R. Donald McGuire, Fredericktown, all of Ohio

[73] Assignee: Dana Corporation, Toledo, Ohio

[21] Appl. No.: 571,300

[22] Filed: Aug. 22, 1990

[51] Int. Cl.[6] .............................................. F16H 5/06
[52] U.S. Cl. ..................................... 74/337.5; 74/371
[58] Field of Search ................. 74/335, 337.5, 371, 74/372, 375, 363, 475, 473 P, 473 R, 89.18

[56] References Cited

U.S. PATENT DOCUMENTS

| Re. 32,125 | 4/1986 | Von Kaler et al. | 74/371 |
|---|---|---|---|
| 802,489 | 10/1905 | Baerbalck | 74/371 |
| 874,563 | 12/1907 | Boulanger | 74/372 |
| 1,189,136 | 6/1916 | Kirchhoff | 74/371 |
| 1,731,819 | 10/1929 | Kirkeby | 74/334 |
| 1,778,365 | 10/1930 | LittleJohn | 74/363 |
| 1,933,908 | 11/1933 | Hoppenstand | 74/337.5 |
| 2,003,794 | 6/1935 | Degrift | 74/337.5 X |
| 2,158,573 | 5/1939 | Eastin | 74/372 |
| 2,893,256 | 7/1959 | Wargo | 74/370 |
| 3,563,110 | 2/1971 | Hauser | 74/473 R |
| 3,812,735 | 5/1974 | Von Kaler et al. | 74/371 |
| 4,019,586 | 4/1977 | Hauser | 192/48.91 |
| 4,337,675 | 7/1982 | Holdman | 74/337.5 X |
| 4,395,240 | 7/1983 | Blanchard | 74/371 X |
| 4,505,164 | 3/1985 | Yoshida | 74/371 |
| 4,510,816 | 4/1985 | Linden | 74/372 |
| 4,656,886 | 4/1987 | Edwards | 74/475 |
| 4,662,241 | 5/1987 | Edwards | 475/206 |
| 4,690,011 | 9/1987 | Sakai et al. | 74/475 |
| 4,702,119 | 10/1987 | Edwards | 74/371 |
| 4,838,108 | 6/1989 | Flanhardt et al. | 74/417 |
| 4,844,227 | 7/1989 | Crawford et al. | 192/3.54 |
| 4,907,466 | 3/1990 | Kuhn | 74/378 |
| 4,921,362 | 5/1990 | Werner | 384/482 |
| 4,932,278 | 6/1990 | Nemoto | 74/371 |

FOREIGN PATENT DOCUMENTS 0741139 11/1943 Germany ................. 74/337.5

Primary Examiner—Dirk Wright
Attorney, Agent, or Firm—MacMillan, Sobanski & Todd

[57] ABSTRACT

A side shifting mechanism for a transaxle includes a shift shaft which is rotatably mounted about an axis which is parallel to the axes of the drive axles. A portion of the shift shaft extends out the side of the transaxle to a location where it can be conveniently grasped by an operator. The shift shaft cooperates with a detent plate located within the transaxle. The detent plate is pivotably mounted on a pivot shaft. Rotation of the shift shaft causes pivoting movement of the detent plate about the pivot shaft. The detent plate is connected to an axially movable shifting collar. The relative position of the collar determines which of a plurality of gear ratios of the transaxle is selected for use. Thus, by rotating the shift shaft, the operator can select a desired gear ratio. In a first embodiment of the invention, the shift shaft and the detent plate are formed having cooperating bevel gear portions. In a second embodiment of the invention, the shift shaft carries a cam driver having a helical groove formed therein which cooperates with a cam formed on the detent plate.

15 Claims, 4 Drawing Sheets

SIDE SHIFTING MECHANISM FOR TRANSAXLE

BACKGROUND OF THE INVENTION

This invention relates in general to combined transmission and axle assemblies, commonly referred to as transaxles, and in particular to an improved shift mechanism for such a transaxle.

In many small powered vehicles, such as riding lawn mowers, garden tractors, golf carts, snowmobiles, and the like, a transaxle is used to provide a driving connection between an engine and a pair of driving wheels. The transaxle includes a housing which contains both a transmission, which is adapted to provide a plurality of gear ratios between the input and output thereof, and an axle assembly, including a differential mechanism. The transmission portion of the transaxle typically includes a gear shaft rotatably mounted within the transaxle housing, a plurality of gears rotatably carried on the gear shaft, and a pair of shift keys for selectively connecting one of the gears to the shaft for rotation therewith. The shift keys are located in opposed longitudinal grooves formed in the gear shaft. An annular collar is supported on the gear shaft and is connected to one end of each of the shift keys. Axial movement of the collar causes corresponding axial movement of the shift keys and consequent changing of the gear ratio of the transmission.

To effect axial movement of the collar, a detent plate is provided. The detent plate has a depending boss formed thereon which extends into an annular groove formed in the outer surface of the collar. Thus, movement of the detent plate causes movement of the collar. The detent plate is secured to a rotatable shift shaft. The shift shaft extends perpendicular to the gear shaft upwardly out of the transaxle housing and the body of the vehicle to a location where it can be grasped by an operator of the vehicle and selectively rotated. To change the gear ratio of the transmission mechanism, the operator grasps and rotates the shift shaft. Such rotation causes the detent plate to pivot about the shift shaft, thereby causing axial movement of the collar and the shift keys as described above.

While the shifting mechanism described above has proven to be effective, it has been found to be occasionally inconvenient to have the shift shaft extend upwardly out of the transaxle. In this arrangement, the shift shaft is usually located between the legs of the operator sitting on the vehicle, an area which is difficult to reach or move comfortably. Some attempts have been made to modify the shift shaft so that after it extends upwardly through the transaxle housing, it bends sideways so as to extend through the side of the body of the vehicle, where it is more convenient to reach. Unfortunately, these modified shift shafts are somewhat difficult to manufacture and maintain in proper position because the shafts are relatively long in length and usually have one or more bends formed therein. Thus, it would be desirable to provide an improved side shifting mechanism for a transaxle which is simple and inexpensive in construction.

SUMMARY OF THE INVENTION

This invention relates to an improved side shifting mechanism for a transaxle. The side shifting mechanism includes a shift shaft which is rotatably mounted about an axis which is parallel to the axes of the drive axles. A portion of the shift shaft extends out the side of the transaxle to a location where it can be conveniently grasped by an operator. The shift shaft cooperates with a detent plate located within the transaxle. The detent plate is pivotably mounted on a pivot shaft. Rotation of the shift shaft causes pivoting movement of the detent plate about the pivot shaft. The detent plate is connected to an axially movable shifting collar. The relative position of the collar determines which of a plurality of gear ratios of the transaxle is selected for use. Thus, by rotating the shift shaft, the operator can select a desired gear ratio. In a first embodiment of the invention, the shift shaft and the detent plate are formed having cooperating bevel gear portions. In a second embodiment of the invention, the shift shaft carries a cam driver having a helical groove formed therein which cooperates with a cam formed on the detent plate.

It is an object of this invention to provide an improved side shifting mechanism for a transaxle.

It is another object of this invention to provide such an improved side shifting mechanism which is simple and inexpensive in construction and operation.

Other objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
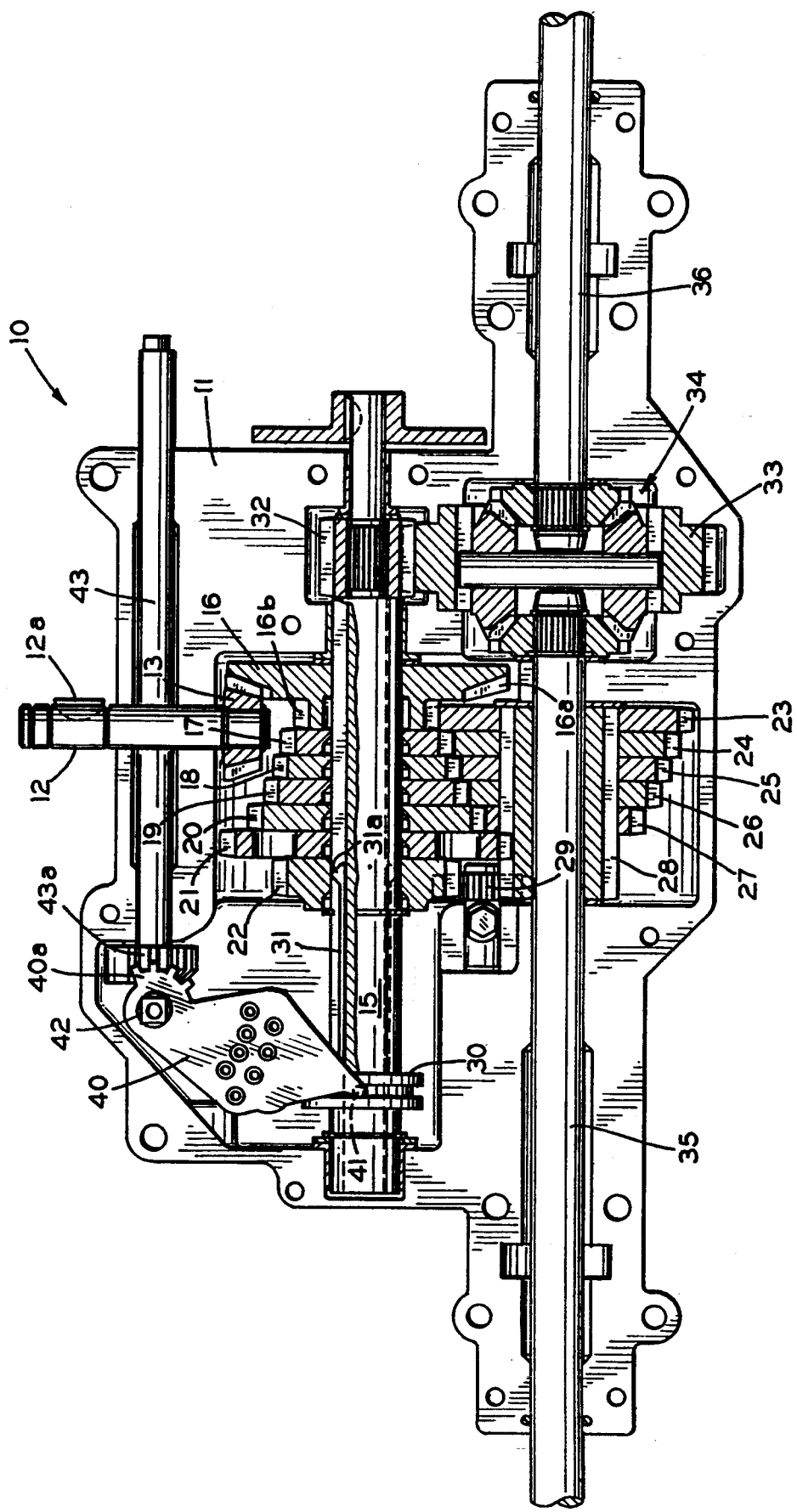
FIG. 1 is a top plan view of a portion of a transaxle including a first embodiment of an improved side shifting mechanism in accordance with this invention.

Referring now to the drawings, there is illustrated in FIG. 1 a portion of a first embodiment of a transaxle, indicated generally at 10. The transaxle 10 includes a lower housing portion 11 which cooperates with a similar upper housing portion (not shown) to provide an enclosure for the transaxle 10. An input shaft 12 extends rearwardly into the transaxle 10. The input shaft 12 is connected by means of a key 12a or similar means to a source of rotational power (not shown), such as an engine. A bevel gear 13 is mounted on the rearward end of the input shaft 12 for rotation therewith.

A gear shaft 15 is journalled for rotation in the housing 11. A plurality of speed gears 16, 17, 18, 19, 20, 21, and 22 are rotatably carried on the gear shaft 15. The speed gear 16 includes a bevel gear portion 16a which cooperates with the bevel gear 13 mounted on the input shaft 12. The speed gear 16 further includes a spur gear portion 16b which cooperates with a reduction gear 23. Similarly, the speed gears 17, 18, 19, 20, and 21 cooperate with corresponding reduction gears 24, 25, 26, 27, and 28. The reduction gears 23, 24, 25, 26, and 27 are splined onto the reduction gear 28. The speed gear 22 cooperates with an idler gear 29 which, in turn, cooperates with the reduction gear 28.

A shifter mechanism is provided for selectively connecting one of the speed gears 16 through 22 to the gear shaft 15 for rotation therewith. The shifter mechanism includes an annular collar 30 which is mounted on the gear shaft 15 for axial sliding movement therealong. Two shift keys 31 are connected to the collar 30 for axial movement therewith. The shift keys 31 are disposed in opposed longitudinal grooves formed in the gear shaft 15 and terminate in outwardly extending lugs 31a. The lugs 31a are adapted to selectively extend into corresponding recesses formed on the inner surfaces of the speed gears 16 through 22. Thus, as is well known in the art, movement of the collar 30 causes the shift keys 31 to selectively engage the speed gears 16 through 22 for rotation with the gear shaft 15. The particular means for effecting axial movement of the collar 30 will be explained in detail below. Thus, it can be seen that the gears 16 through 29 form the transmission portion of the transaxle 10, with the gear shaft 15 operating as the output shaft of such transmission portion.

A spur gear 32 is connected to the gear shaft 15 for rotation therewith. The spur gear 32 cooperates with a ring gear 33 of a differential portion (indicated generally at 34) of the transaxle 10. The differential 34 is conventional in the art and includes a pair of drive axles 35 and 36 extending outwardly therefrom. The drive axles 35 and 36 are journalled in the housing 11 for rotation about a common axis, which axis is parallel to the gear shaft 15. The reduction gears 23 through 28 are rotatably supported on the drive axle 35.

The structure of the transaxle 10 thus far described is conventional in the art. Rotation of the input shaft 12 causes corresponding rotation of the speed gear 16, the reduction gears 23 through 28, the idler gear 29, and the remaining speed gears 17 through 22. If the collar 30 is positioned such that the shift keys 31 engage one of the recesses formed on the speed gears 16 through 22, then the gear shaft 15 (and the spur gear 32 mounted thereon) will rotate therewith. It will be appreciated by those skilled in the art that the selection of the speed gear 21 represents the lowest available forward gear ratio for the transmission portion of the transaxle, while the selection of the speed gear 16 represents the highest available forward gear ratio. Also, it can be seen that the selection of the speed gear 22 represents the sole available reverse gear ratio.

Figure 2:
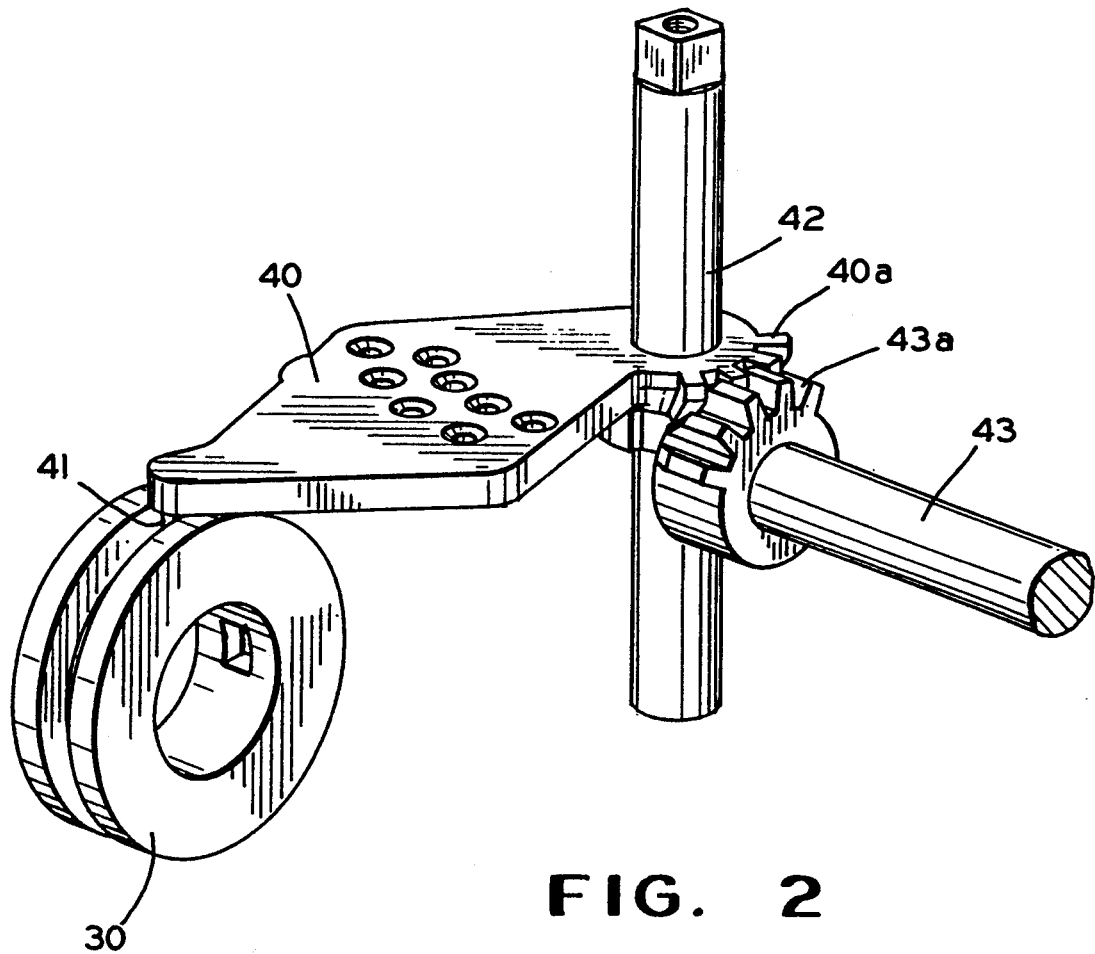
FIG. 2 is a perspective view of the side shifting mechanism of the transaxle illustrated in FIG. 1
Figure 3:
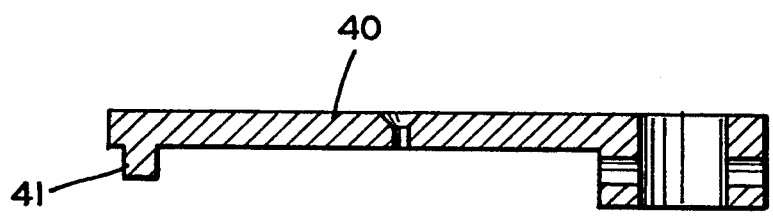
FIG. 3 is a sectional elevational view of the detent plate illustrated in FIGS. 2 and 3.

Referring now to FIGS. 2 and 3, the means for effecting axial movement of the collar 30 along the gear shaft 15 is illustrated in detail. As shown therein, a detent plate 40 is provided with a depending boss 41. The boss 41 extends into an annular groove formed in the circumferential outer surface of the collar 30. The detent plate 40 is secured to an upstanding pivot shaft 42. The upper and lower ends of the pivot shaft 42 are journalled in the transaxle housing 11 for rotational movement. Thus, the pivot shaft 42 defines an axis about which the detent plate 40 can pivot. Such pivoting movement of the detent plate 40 causes axial movement of the collar 30 and the shift keys 31 as described above, resulting in gear ratio selection of the transmission portion of the transaxle 10. The pivot shaft 42 extends perpendicular to the gear shaft 15 and the drive axles 35 and 36.

A portion of a bevel gear 40a is formed on one side of the detent plate 40 adjacent to the pivot shaft 42. The bevel gear portion 40a cooperates with a corresponding portion of a bevel gear 43a formed on one end of a shift shaft 43. Alternatively, the bevel gear 43a may be formed as a separate part connected the shift shaft 43. As best shown in FIG. 1, the shift shaft 43 is journalled for rotation in the transaxle housing 11. The shift shaft 43 extends parallel to the gear shaft 15 and to the drive axles 35 and 36. The opposite end of the shift shaft 43 extends outwardly through the side of the transaxle housing 11. A simple straight extension member (not shown) may be connected to the end of the shift shaft 43 to extend the length thereof outside the body of the vehicle in which the transaxle 10 is installed. Because the shift shaft 43 extends out of the side of the transaxle housing 11 (and the extension member extends out of the side of the vehicle body), it can be easily manipulated by an operator of the vehicle.

Because of the cooperation of the bevel gear portions 40a and 43a, it can be seen that rotation of the shift shaft 43 causes rotation of the pivot shaft 42. As a result, the detent plate 40 is pivoted about the axis of the pivot shaft 42. The boss 41 cooperates with the collar 30 to translate the pivoting movement of the detent plate 40 into axial movement of the collar 30 along the gear shaft 15. In this manner, a desired one of the plurality of gear ratios of the transmission portion of the transaxle 10 can be selected for use.

Figure 4:
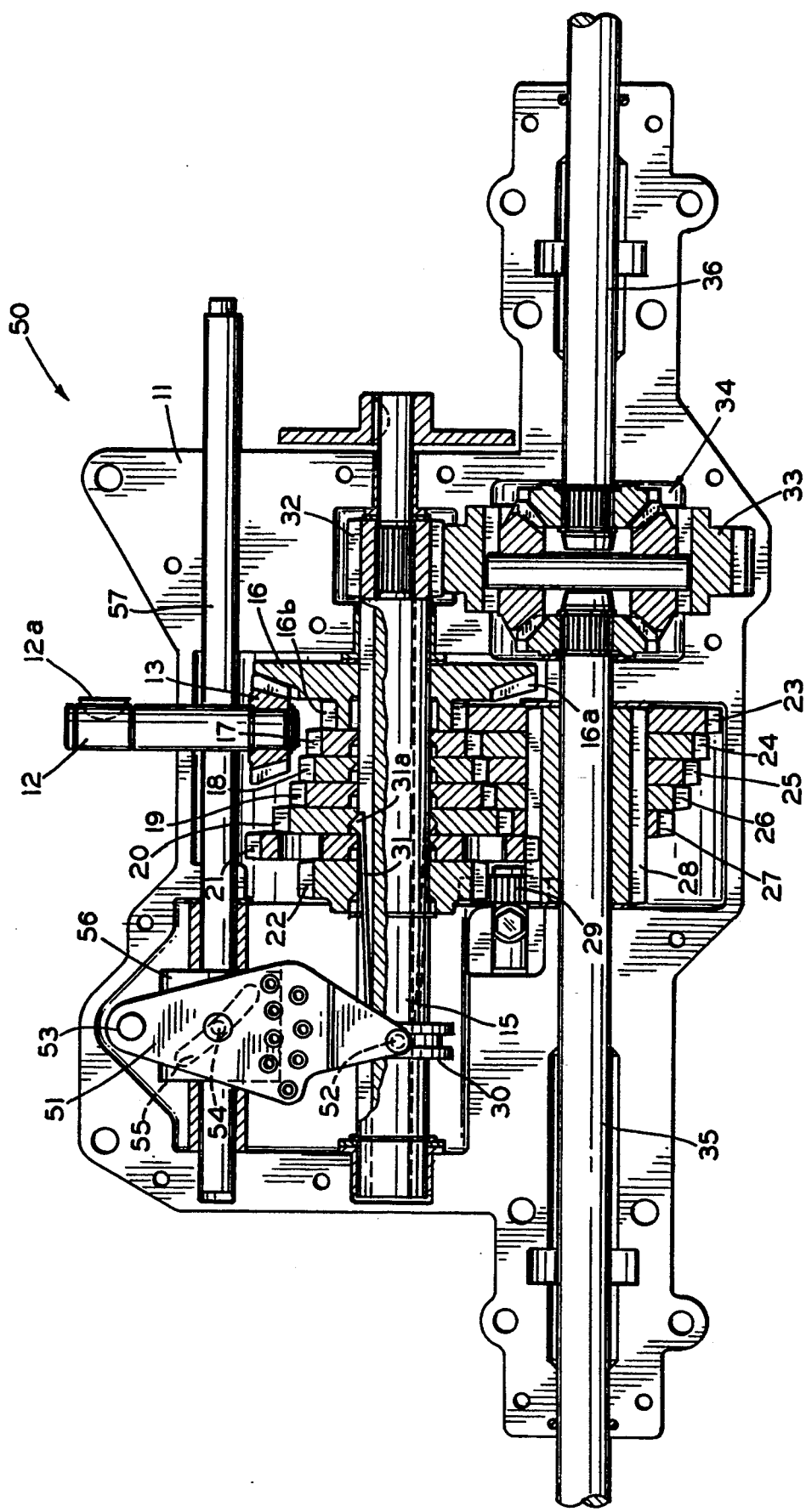
FIG. 4 is a top plan view of a portion of a transaxle including a second embodiment of an improved side shifting mechanism in accordance with this invention.
Figure 5:
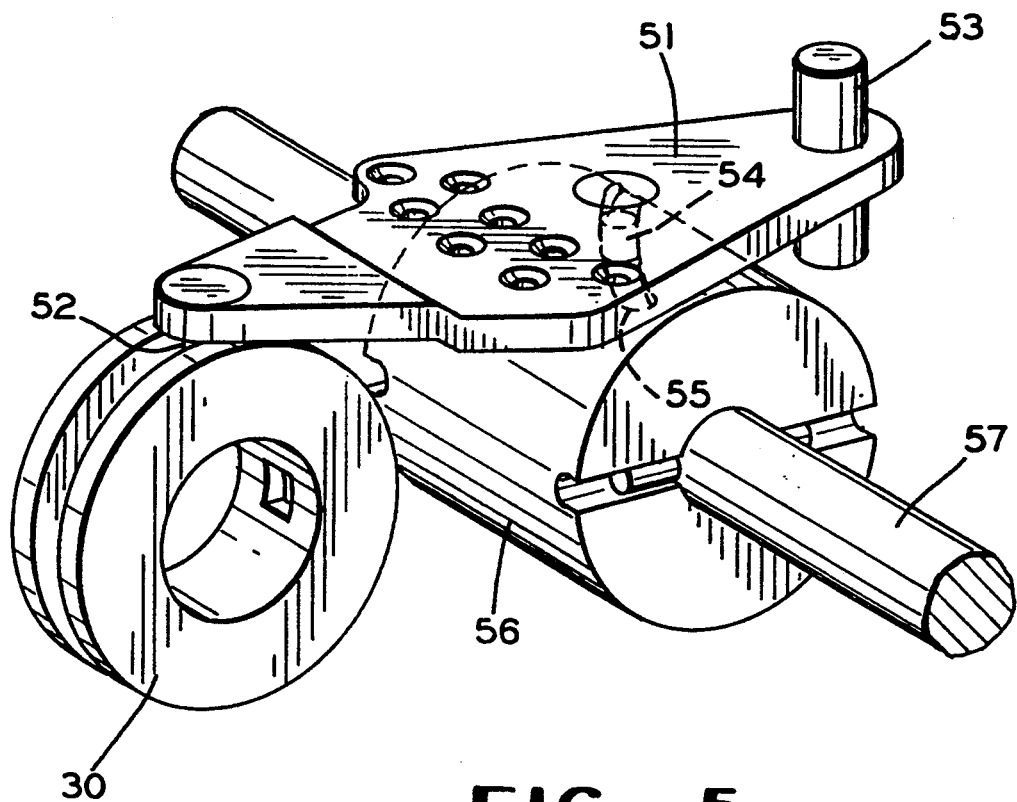
FIG. 5 is perspective view of the side shifting mechanism of the transaxle illustrated in FIG. 4.
Figure 6:
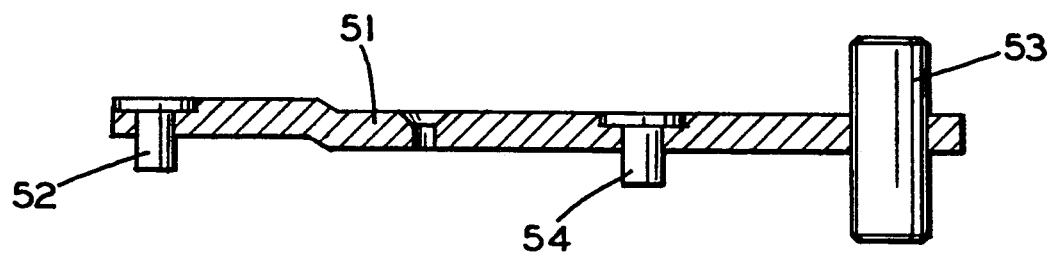
FIG. 6 is a sectional elevational view of the detent plate illustrated in FIGS. 4 and 5.

Referring now to FIGS. 4, 5, and 6, a portion of a second embodiment of a transaxle, indicated generally at 50, is illustrated. The structure and operation of the transaxle 50 is, in large measure, identical to the transaxle 10 described above, and like reference numerals are used to indicate similar components. The transaxle 50 differs from the transaxle 10 only in the means for effecting axial movement of the collar 30. Such means includes a modified detent plate 51, which is provided with a depending boss 52. As above, the boss 52 extends into the annular groove formed in the circumferential outer surface of the collar 30. The detent plate 51 is secured to an upstanding pivot shaft 53. The pivot shaft 53 extends perpendicular to the gear shaft 15 and the drive axles 35 and 36. The upper and lower ends of the pivot shaft 53 are journalled in the transaxle housing 11 for rotational movement. Thus, the pivot shaft 53 defines an axis about which the detent plate 51 can pivot to effect axial movement of the collar 30 and the shift keys 15, as described above.

As best shown in FIG. 6, the detent plate 51 is further provided with a depending cam 54. The cam 54 cooperates with a helical groove 55 formed in a cam driver 56 connected to a rotatable shift shaft 57. When the shift shaft 57 is rotated as described above, the cam driver 56 rotates therewith. Because of the cooperation of the cam 54 with the helical groove 55, such rotation causes the detent plate 51 to pivot about the axis defined by the pivot shaft 53. Thus, the collar 30 is moved axially along the gear shaft 15 in the manner described above to select a desired one of the plurality of gear ratios of the transmission portion of the transaxle 10 for use.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A transaxle comprising:
an input shaft;

a transmission connected to said input shaft for providing a plurality of gear ratios between said input shaft and a transmission output shaft, said transmission including an axially movable shift collar for selecting one of said plurality of gear ratios for use;

a differential connected between said transmission output shaft and a pair of drive axles, said drive axles being rotatable about a common axis of rotation; and means for selecting one of said plurality of gear ratios for use, said selecting means including a shift shaft which is rotatable about an axis which is parallel to said axis of rotation of said drive axles, a pivotable detent plate engaged with said shift collar such that pivoting movement of said detent plate causes axial movement of said shift collar, and cooperating means formed on said shift shaft and said detent plate for translating rotational movement of said shift shaft into pivoting movement of said detent plate and axial movement of said shift collar, said cooperating means including first means fixed on said shift shaft for rotation therewith and second means fixed on said detent plate for pivoting movement therewith, said first and second means directly engaging one another.

2. The invention defined in claim 2 wherein said cooperating means includes respective bevel gear portions formed on said shift shaft and said detent plate.

3. The invention defined in claim 1 wherein said cooperating means includes a cam formed on said detent plate and a cam driver having a groove formed therein connected to said shift shaft, said cam extending into said groove so as to cooperate with said cam driver.

4. A transaxle comprising:
a housing;
a rotatable input shaft extending into said housing;
a pair of drive axles extending outwardly from said housing, said drive axles being rotatable about a common axis of rotation;
a gear shaft mounted for rotation within said housing about an axis;
a plurality of differently sized speed gears rotatably mounted about said gear shaft, one of said speed gears cooperating with said input shaft for rotation therewith;
a plurality of differently sized reduction gears connected together for joint rotation about one of said drive axles, each of said reduction gears cooperating with one of said speed gears for rotation therewith;
means for selectively connecting one of said speed gears to said gear shaft for rotation therewith, said means for selectively connecting including a pair of shift keys slidably disposed in respective grooves formed in said gear shaft and selectively engageable with each of said speed gears for connecting same to said gear shaft and an annular collar slidably mounted about said gear shaft and connected to said shift keys;
a differential connected between said gear shaft and said drive axles; and
means for moving said means for selectively connecting, said moving means including a shift shaft which is rotatable about an axis which is parallel to said axis of rotation of said drive axles, a pivotable detent plate engaged with said shift collar such that pivoting movement of said detent plate causes axial movement of said shift collar and said shift keys, and cooperating means formed on said shift shaft and said detent plate for translating rotational movement of said shift shaft into pivoting movement of said detent plate and axial movement of said shift collar and said shift keys, said cooperating means including first means fixed on said shift shaft for rotation therewith and second means fixed on said detent plate for pivoting movement therewith, said first and second means directly engaging one another.

5. The invention defined in claim 4 wherein said cooperating means includes respective bevel gear portions formed on said shift shaft and said detent plate.

6. The invention defined in claim 4 wherein said cooperating means includes a cam formed on said detent plate and a cam driver connected to said shift shaft for rotation therewith, said cam driver having a groove formed therein, said cam extending into said groove so as to cooperate with said cam driver.

7. The invention defined in claim 6 wherein said groove is helical in shape.

8. A transaxle comprising:
an input shaft;
a transmission connected to said input shaft for providing a plurality of gear ratios between said input shaft and a transmission output shaft;
a differential connected between said transmission output shaft and a pair of drive axles, said drive axles being rotatable about a common axis of rotation; and
means for selecting one of said plurality of gear ratios for use, said selecting means including a shift shaft which is rotatable about an axis which is parallel to said axis of rotation of said drive axles, a pivotable detent plate connected to said transmission for selecting one of said plurality of gear ratios for use, and cooperating means formed on said shift shaft and said detent plate for translating rotating movement of said shift shaft about said axis into pivoting movement of said detent plate, said cooperating means including respective bevel gear portions formed on said shift shaft and said detent plate.

9. A transaxle comprising:
a housing;
a rotatable input shaft extending into said housing;
a pair of drive axles extending outwardly from said housing, said drive axles being rotatable about a common axis of rotation;
a gear shaft mounted for rotation within said housing about an axis;
a plurality of differently sized speed gears rotatably mounted about said gear shaft, one of said speed gears cooperating with said input shaft for rotation therewith;
a plurality of differently sized reduction gears connected together for joint rotation about one of said drive axles, each of said reduction gears cooperating with one of said speed gears for rotation therewith;
means for selectively connecting one of said speed gears to said gear shaft for rotation therewith, said means for selectively connecting including a pair of shift keys slidably disposed in respective grooves formed in said gear shaft and selectively engageable with each of said speed gears for connecting same to said gear shaft and an annular collar slidably mounted about said gear shaft and connected to said shift keys;

a differential connected between said gear shaft and said drive axles; and means for moving said means for selectively connecting, said moving means including a shift shaft which is rotatable about an axis which is parallel to said axis of rotation of said drive axles, cooperating means formed on said shift shaft and said detent plate for translating rotating movement of said shift shaft about said axis into pivoting movement of said detent plate, said cooperating means including respective bevel gear portions formed on said shift shaft and said detent plate.

10. A transaxle comprising:

an input shaft;

a transmission connected to said input shaft for providing a plurality of gear ratios between said input shaft and a transmission output shaft;

a differential connected between said transmission output shaft and a pair of drive axles, said drive axles being rotatable about a common axis of rotation; and means for selecting one of said plurality of gear ratios for use, said selecting means including a shift shaft which is rotatable about an axis which is parallel to said axis of rotation of said drive axles, a pivotable detent plate connected to said transmission for selecting one of said plurality of gear ratios for use, and cooperating means formed on said shift shaft and said detent plate for translating rotating movement of said shift shaft about said axis into pivoting movement of said detent plate, said cooperating means including a cam formed on one of said detent plate and said shift shaft and a cam driver having a groove formed therein connected to the other of said detent plate and said shift shaft, said cam extending into said groove so as to cooperate with said cam driver.

11. The invention defined in claim 10 wherein said cam is formed on said detent plate and said cam driver is connected to said shift shaft.

12. The invention defined in claim 11 wherein said groove is helical in shape.

13. A transaxle comprising:

a housing;

a rotatable input shaft extending into said housing;

a pair of drive axles extending outwardly from said housing, said drive axles being rotatable about a common axis of rotation;

a gear shaft mounted for rotation within said housing about an axis;

a plurality of differently sized speed gears rotatably mounted about said gear shaft, one of said speed gears cooperating with said input shaft for rotation therewith;

a plurality of differently sized reduction gears connected together for joint rotation about one of said drive axles, each of said reduction gears cooperating with one of said speed gears for rotation therewith;

means for selectively connecting one of said speed gears to said gear shaft for rotation therewith, said means for selectively connecting including a pair of shift keys slidably disposed in respective grooves formed in said gear shaft and selectively engageable with each of said speed gears for connecting same to said gear shaft and an annular collar slidably mounted about said gear shaft and connected to said shift keys;

a differential connected between said gear shaft and said drive axles; and means for moving said means for selectively connecting, said moving means including a shift shaft which is rotatable about an axis which is parallel to said axis of rotation of said drive axles, cooperating means formed on said shift shaft and said detent plate for translating rotating movement of said shift shaft about said axis into pivoting movement of said detent plate, said cooperating means including a cam formed on one of said detent plate and said shift shaft and a cam driver having a groove formed therein connected to the other of said detent plate and said shift shaft, said cam extending into said groove so as to cooperate with said cam driver.

14. The invention defined in claim 13 wherein said cam is formed on said detent plate and said cam driver is connected to said shift shaft.

15. The invention defined in claim 13 wherein said groove is helical in shape.

* * * * *

UNITED STATES PATENT AND TRADEMARK OFFICE
CERTIFICATE OF CORRECTION

PATENT NO. : 5,400,671

DATED : March 28, 1995

INVENTOR(S) : James E. Hall, James H. Bostic, Timothy L. Teeter and R. Donald McGuire It is certified that error appears in the above-identified patent and that said Letters Patent is hereby corrected as shown below:

Column 5, Claim 2, line 1, after "claim", change "2" to -- 1 --.

Column 7, Claim 12, line 1, after "claim", change "11" to -- 10 --.

Signed and Sealed this

Thirtieth Day of May, 1995

Attest:

BRUCE LEHMAN

*Attesting Officer*     *Commissioner of Patents and Trademarks*